United States Patent [19]

Oono

[11] Patent Number: 4,607,291
[45] Date of Patent: Aug. 19, 1986

[54] IMAGE FORMING APPARATUS

[75] Inventor: Ken'ichi Oono, Kawasaki, Japan

[73] Assignee: Kabushiki Kaisha Toshiba, Kawasaki, Japan

[21] Appl. No.: 641,774

[22] Filed: Aug. 17, 1984

[30] Foreign Application Priority Data

Aug. 25, 1983 [JP] Japan ................................ 58-155516
Feb. 6, 1984 [JP] Japan ................................ 59-19785

[51] Int. Cl.$^4$ ............................................. H04N 1/04
[52] U.S. Cl. ................................. 358/286; 358/293; 358/296; 355/14 SH; 346/76 PH
[58] Field of Search ............... 358/256, 286, 285, 293, 358/303, 296; 346/76 PH; 355/5, 18, 19, 14 SH; 353/50

[56] References Cited

U.S. PATENT DOCUMENTS

| | | | |
|---|---|---|---|
| 3,187,624 | 6/1965 | Lazinski | 353/50 |
| 4,404,568 | 9/1983 | Kikuchi et al. | 346/76 PH |
| 4,563,468 | 3/1985 | Serinken et al. | 179/2 TV |

Primary Examiner—James J. Groody
Assistant Examiner—Edward L. Coles
Attorney, Agent, or Firm—Cushman, Darby & Cushman

[57] ABSTRACT

An overhead projector is provided adjacent to an image forming unit for forming an image on a sheet according to an image information. A conveying unit for conveying the sheet on which an image is formed by the image forming unit is provided between the image forming unit and the overhead projector. A detachable tray is located in the path between the conveyor unit and the overhead projector. The sheet on which an image is formed by the image forming unit is conveyed to the overhead projector and the image on the sheet is projected on a screen.

20 Claims, 16 Drawing Figures

IMAGE FORMING APPARATUS

BACKGROUND OF THE INVENTION

The present invention relates to an image forming apparatus for forming an image on a sheet according to image information.

For example, a thermal head printer is known as an image forming apparatus of this type. Such a thermal head printer is known to be compact and inexpensive and to generate less noise. Since a thermal head printer can perform projection onto a normal paper sheet or an overhead projection paper sheet, it is used for a recording output of a calculator, a wordprocessor, or a copying machine.

On the other hand, in a meeting such as a meeting for research work or a report meeting, an overhead projector which enlarges and projects an enlarged image is used as an aid in explaining an article or report.

For example, in a meeting, copies of a document are distributed to the members at the meeting and an explanation of the copy is performed while an image of the copy is projected by the overhead projector. In this case, the document is copied by a copying machine and then one of the copies (copied on an overhead projection paper sheet) is set on the overhead projector and is projected on a screen. For this reason, the copying machine and the overhead projector are separately used, resulting in inconvenience.

SUMMARY OF THE INVENTION

It is an object of the present invention to provide an image forming apparatus wherein an image is formed on a sheet according to image information, and the image formed on the sheet can be readily projected by an overhead projector.

According to an aspect of the present invention, there is provided an image forming apparatus for forming an image on a sheet according to an image signal and projecting the image formed on the sheet on a screen, comprising image forming means for forming the image on the sheet according to an image signal, projecting means for projecting the image formed on the sheet, which is arranged adjacent to the image forming means, and conveying means for conveying the sheet having the image formed by the image forming means thereon to the projecting means.

DETAILED DESCRIPTION OF THE PREFERRED EMBODIMENTS

Embodiments of the present invention will be described in detail with reference to the accompanying drawings hereafter. A first embodiment of the present invention will first be described with reference to FIGS. 1 to 11 in detail.

Figure 1:
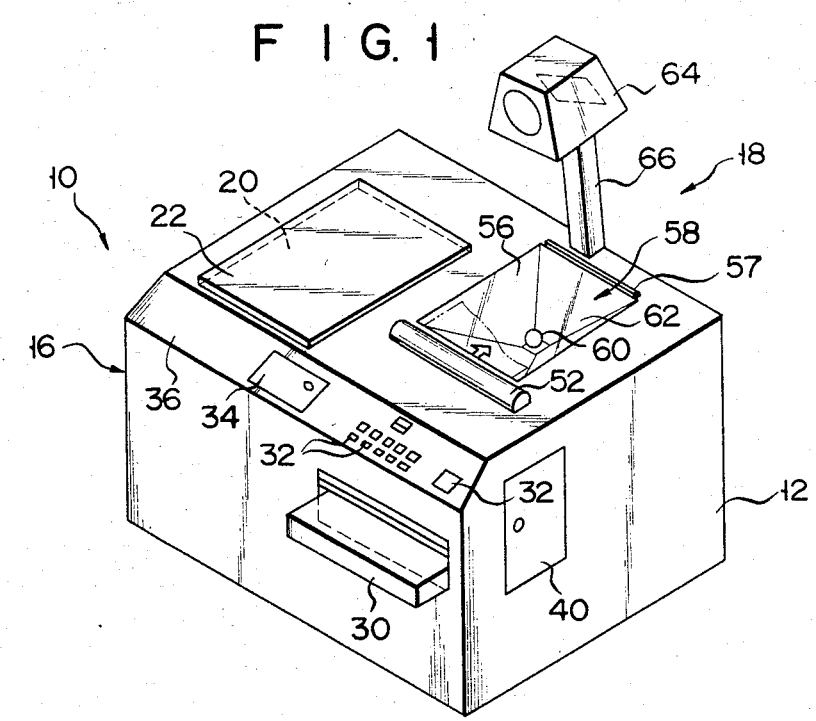
FIG. 1 is a schematic view of an image forming apparatus according to a first embodiment of the present invention.
Figure 2:
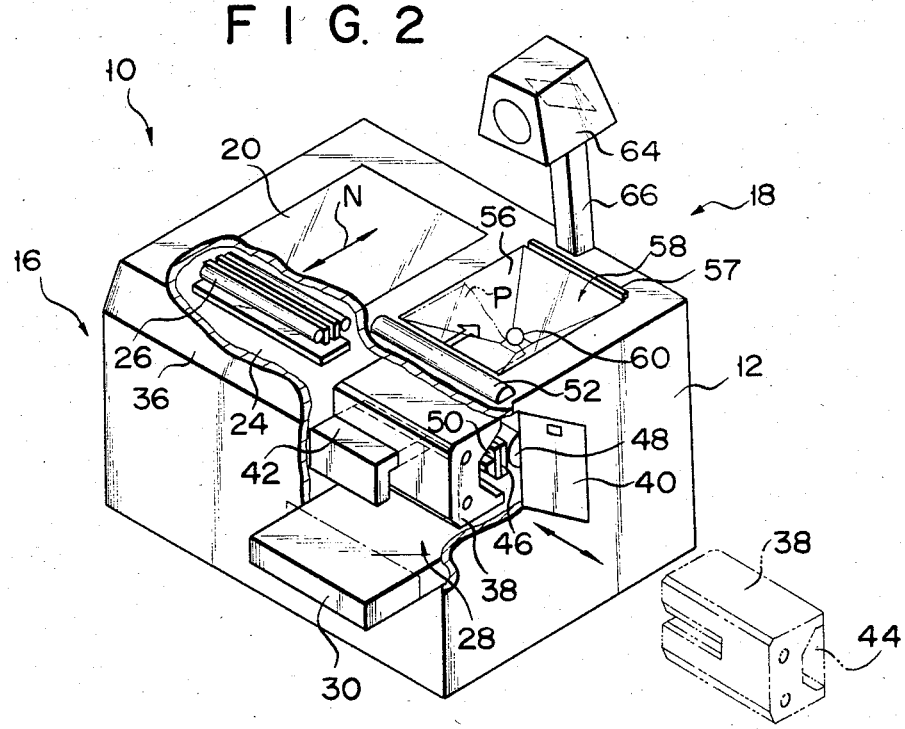
FIG. 2 is a cutaway perspective view schematically showing the image forming apparatus shown in FIG. 1.

As shown in FIGS. 1 and 2, in an image forming apparatus 10 according to the present invention, an image forming unit 14 having a thermal transfer function and an overhead projector unit 18 for projecting an image from a paper sheet or transparent sheet P onto a screen 16 (see FIG. 11) are integrally formed with a housing 12. In the image forming unit 14, a document table 20 for placing a document to be copied is arranged at the upper side of the housing 12. The document table 20 is formed of a transparent material such as glass. A cover 22 for covering a document placed on the document table 20 is provided on the document table 20 to be freely opened/closed. At the lower side of the document table 20, a scanning unit 24 is provided for scanning the document placed on the document table 20. An exposing optical system 26 is movably arranged in the scanning unit 24 along the direction indicated by arrow N. The scanning unit 24 has another function of converting image information obtained from the scanning unit 24 into an electrical signal. A thermal transfer unit (or an image forming unit) 28, which forms an image on the sheet P corresponding to the electrical signal from the scanning unit 24, is provided at a substantially central portion of the housing 12. A sheet feed cassette 30 for feeding a sheet to thermally transfer an image thereon to the thermal transfer unit 28 is detachably disposed at the front portion of the housing 12. At the upper front surface of the housing 12, a start switch 32, a keyboard 32 having numerical keys of numbers 0 to 9, and an operation panel 36 having a display panel 34 for displaying instructions for the operation such as "jamming" are respectively provided.

A door 40 for allowing loading of a ribbon cassette 38 (to be described later) as a transfer material is provided to be freely opened/closed at the side surface of the housing 12.

A holder 42 for controlling a position of the ribbon cassette 38 and for holding it when the ribbon cassette 38 is loaded, and a thermal head 46 having heat elements for heating an exposed portion of a ribbon 44 from the ribbon cassette 38 are respectively provided in the thermal transfer unit 28. The thermal head 46 is selectively heated in accordance with a pattern signal from the exposure optical system 26 described above. Then, the thermal head 46 melts a color material and transfers it to the sheet P. A platen 48 for pressing the ribbon 44 and the sheet P so as to bring them into tight contact with the thermal head 46 is arranged at a position to oppose the thermal head 46 through the ribbon 44. A heat radiating plate 50 for radiating the heat from the thermal head 46 is provided at the back side of the thermal head 46 (at the side of the sheet feed cassette 30).

Figure 3:
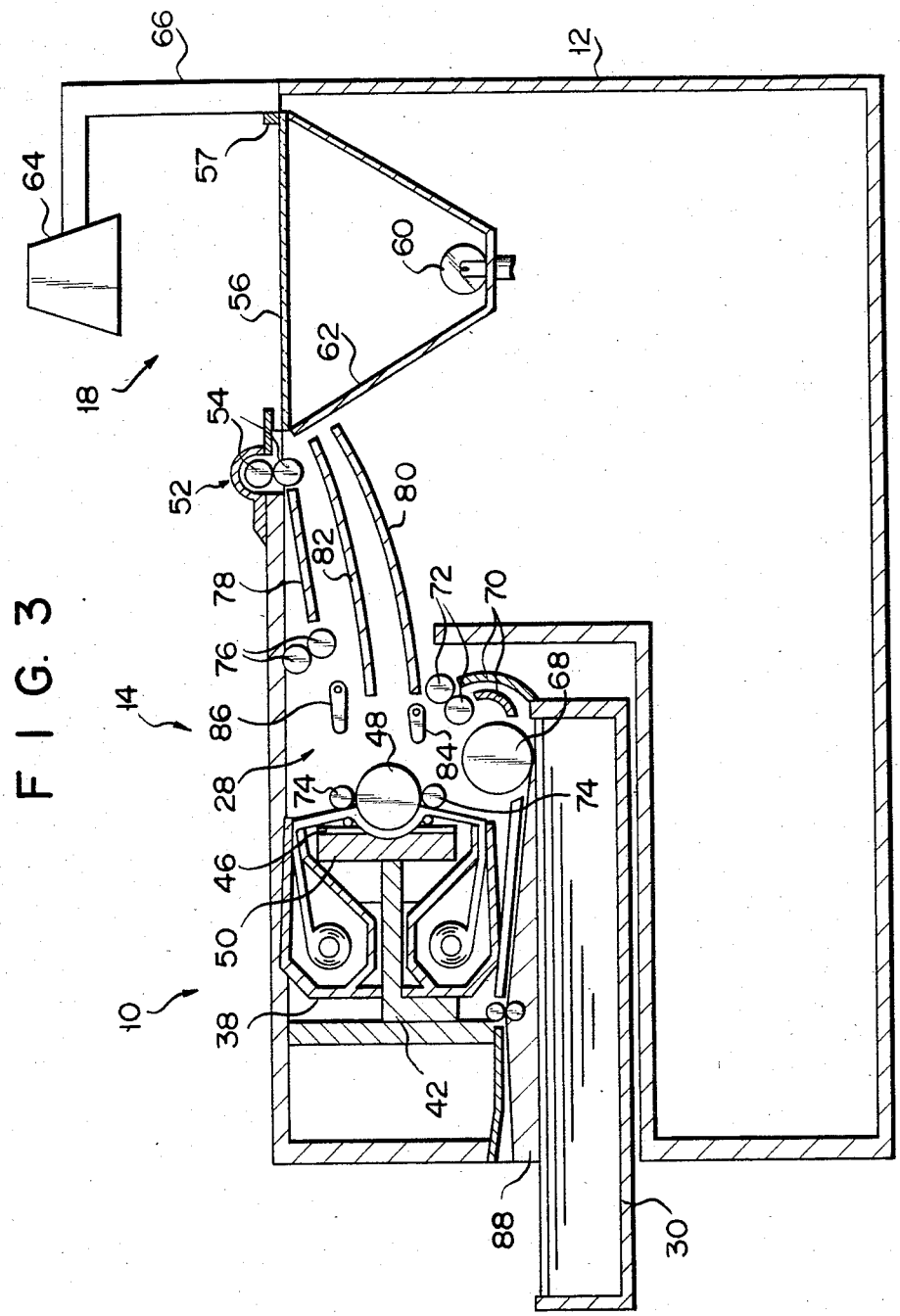
FIG. 3 is a schematic sectional view of the image forming apparatus shown in FIG. 1.

A conveying unit (conveying means) 52 for conveying the sheet P, on which an image is formed by the thermal transfer unit 28, to the overhead projector unit 18 is provided on the housing 12. A pair of convey rollers 54 are provided in the conveying unit 52, as shown in FIG. 3. The convey rollers 54 clamp the sheet P conveyed from the thermal transfer unit 28 therebetween and convey it along the direction indicated by arrow M (FIG. 2) upon being rotated. The overhead projector unit 18 is integrally provided with the housing 12 next to the conveying unit 52. An overhead projector table 56 for placing the sheet (generally, a transparent plastic sheet for an overhead projector) conveyed from the conveying unit 52 is provided at the upper surface of the housing 12. The overhead projector table 56 is formed of a transparent material such as glass. A stopper 57 is fixed at one end of the overhead projector table 56 for stopping the conveyed sheet P and for aligning it. An illumination unit 58 is arranged below the overhead projector table 56 so as to illuminate it. The illumination unit 58 comprises a lamp 60 and a mirror unit 62 formed in an inverse pyramid shape at the peripheral portion of the lamp 60.

A projection head 64 for projecting an image of a document placed on the overhead projector table 56 onto the screen 16 is fixed on the housing 12 through a stand 66 above the overhead projector table 56. The projection head 64 converges the light illuminated from the lighting unit 58 and projects it onto the screen 16 as will be described later.

The thermal transfer unit 28 described above will now be described with reference to FIG. 3. A pick-up roller 68 is disposed in front of the sheet feed cassette 30 to pick up the sheets therefrom. A pair of guide plates 70 for guiding the sheet P picked up by the pick-up roller 68 and a pair of resist rollers 72 for aligning a leading end of the sheet P guided by the guide plates 70 are respectively provided in the vicinity of the pick-up roller 68. Press rollers 74 are provided on and under the platen 48 in order to wind the sheet P conveyed from the resist rollers 72 around the platen 48. The sheet P is brought into tight contact with the platen 48 by the press rollers 74. Discharging rollers 76 and a discharging guide plate 78 are arranged between the thermal transfer unit 28 and the conveying unit 52 so as to discharge the sheet P having an image thereon or to convey it to the conveying unit 52. First and second guide plates 80 and 82 are provided below the discharging guide plate 78. The first and second guide plates 80 and 82 guide the sheet P so as to temporarily store it thereon during the image forming operation.

A first selector guide 84 is pivotally provided between the first guide plate 80 and the platen 48 to select the convey direction of the sheet P when an image is formed on the sheet P. The first selector guide 84 guides the sheet P along the direction from the resist rollers 72 to the platen 48 or the direction from the platen 48 to the first guide plate 80. A second selector guide 86 is pivotally provided between the second guide plate 82 and the platen 48 so as to guide the sheet P along the direction toward the discharging guide plate 78 or the direction toward the second guide plate 82. In FIG. 3, reference numeral 88 denotes a manual feed guide for allowing the operation to manually feed the sheets one by one. When a plurality of copies are formed, the normal paper sheets stored in the sheet feed cassette 30 are used. On the other hand, when an overhead projection is performed, each transparent plastic sheet for overhead projection can be fed by this manual feed guide 88. In this case, the overhead projection sheets can be stored in the sheet feed cassette 30 without using the manual feed guide 88.

Figure 4:
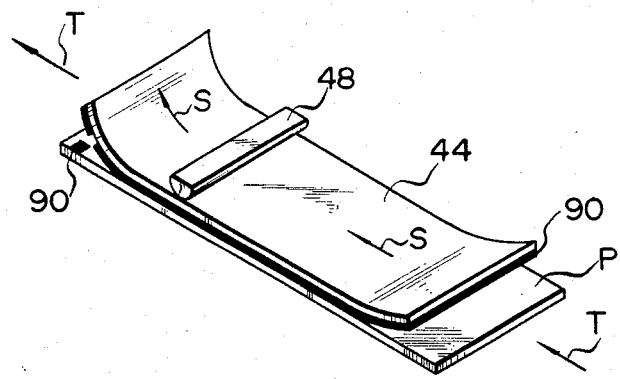
FIG. 4 is a perspective view for explaining the image forming principle of the image forming apparatus shown in FIG. 1.

The thermal transfer printing mechanism of the thermal head 46 is shown in FIG. 4. An ink 90 coated on the ribbon 44 is melted by heat generated from the thermal head 46 and is transferred to the sheet P. During thermal transfer printing, the ribbon 44 and the paper sheet P are simultaneously shifted in the directions indicated by arrows S and T, respectively.

Figure 5:
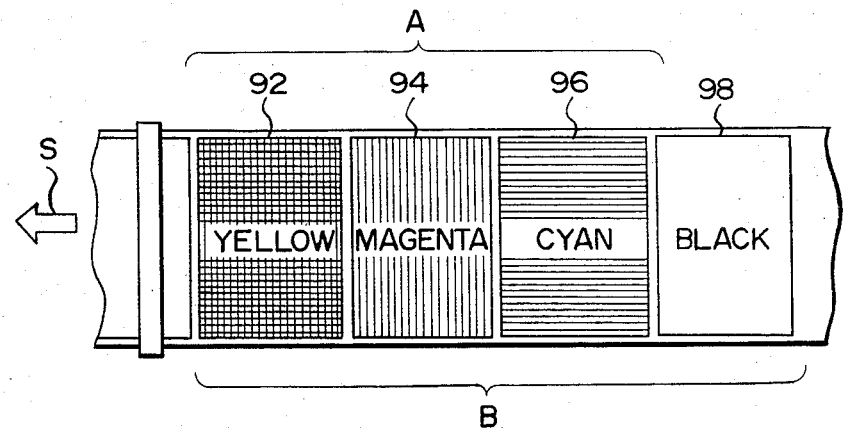
FIG. 5 is a plan view showing the ink-coated state of a ribbon used in the image forming apparatus shown in FIG. 1.

As shown in FIG. 5, the ribbon 44 has an area A having a yellow portion 92, a magenta portion 94 and a cyan portion 96, or an area B consisting of the area A and an additional black portion 98. When the thermal transfer operation is performed, a first color ink is transferred to the sheet P, the sheet P is fed back, and then the next color ink is transferred thereto. This operation is repeated to transfer a full color image. In general, three color components in the area A are mixed to reproduce a black image. However, when the black image portion is to be emphasized, a four-color ribbon having the area B encluding a black ink is used.

The transfer operation of the image forming unit 28 in full color printing will be described with reference to FIGS. 6 to 9.

Figure 6:
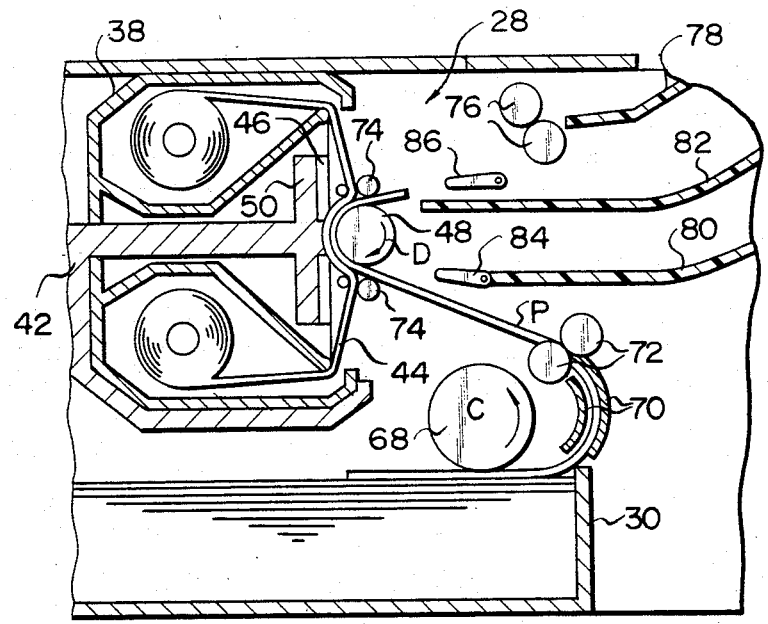
FIGS. 6 to 9 are respectively views for explaining the image forming operation of the image forming apparatus shown in FIG. 1.

As shown in FIG. 6, when the pick-up roller 68 is rotated in a direction indicated by arrow C, the sheet P is picked up from the sheet feed cassette 30. The picked-up paper sheet P is guided by the guide plates 70 to the resist rollers 72. The leading end of the sheet P is aligned by the resist rollers 72. The sheet P is further conveyed by the resist rollers 56 until it reaches the platen 48. Since the platen 48 is rotated in the direction indicated by arrow D, the sheet P is fed along the platen 48 until it opposes the thermal head 46 through the ribbon 44. The thermal head 46 then prints an image on the sheet P in response to a signal from the exposure optical system 26 in such a manner that the first ink of the ribbon 44 is melted and transferred to the sheet P.

Figure 7:
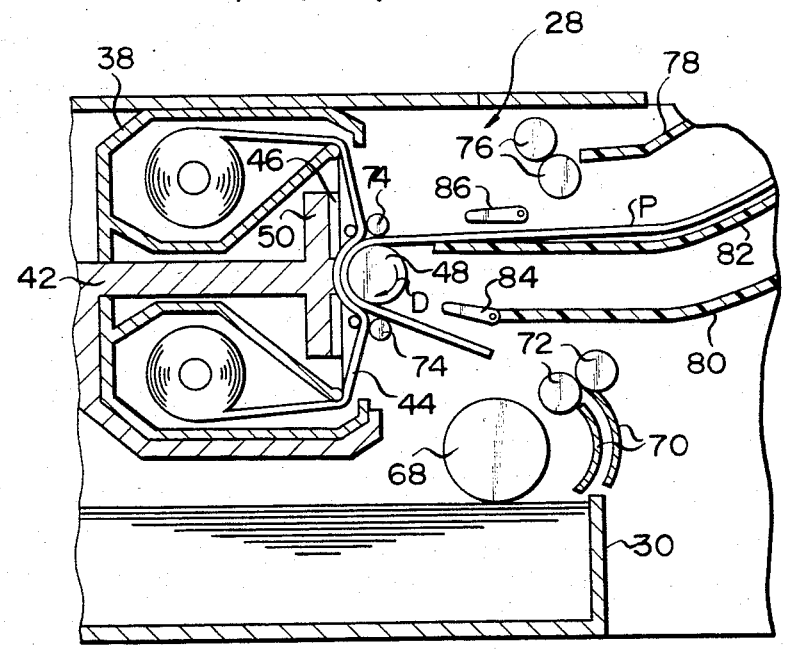

As shown in FIG. 7, the second selector guide 86 is located to be substantially parallel to the second guide plate 82 and guides and temporarily locates the sheet P on the second guide plate 82 after the first transferring on the sheet P by the thermal head 46 (i.e., after the sheet P is printed with the first color). The first selector guide 84 is pivoted downward when the sheet P passes therethrough.

Figure 8:
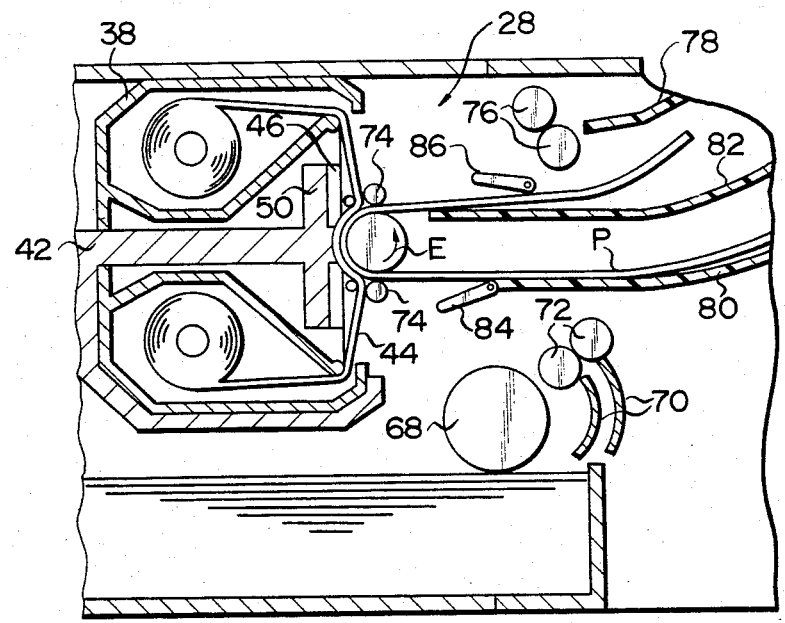

The sheet P printed with the first color is shifted from the second guide plate 82 to the first guide plate 80, as shown in FIG. 8. In other words, the sheet P must be temporarily fed back for second color printing. For this purpose, the sheet P is fed back along the first guide plate 80. The platen 48 is rotated counterclockwise (i.e., in the direction indicated by arrow E), and the sheet P is fed along the first guide plate 80. Since the first selector guide 84 is held at the lower position, the sheet P can be smoothly fed onto the first guide plate 80.

Figure 9:
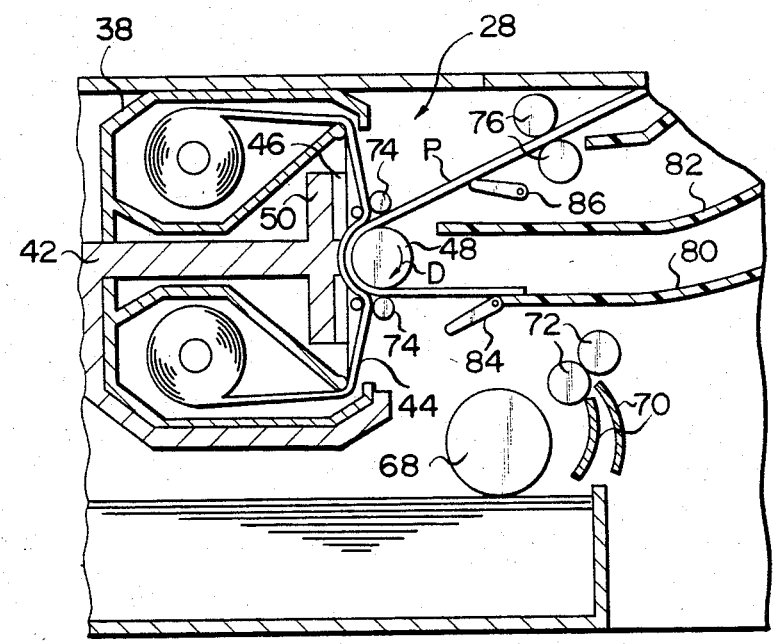

When the sheet P is completely moved on the first guide plate 80, the platen 48 is rotated again in the direction indicated by arrow D, as shown in FIG. 9, and the sheet P is subjected to second color transferring. In this manner, the second, third and fourth color inks are transferred to the sheet P. Thereafter, the second selector guide 86 is kept at the upper pivot position so as to guide the sheet P onto the discharging guide plate 78. The sheet P having the transferred image is conveyed to the table 56 of the overhead projector unit 18 described above through the conveying unit 52.

Figure 10:
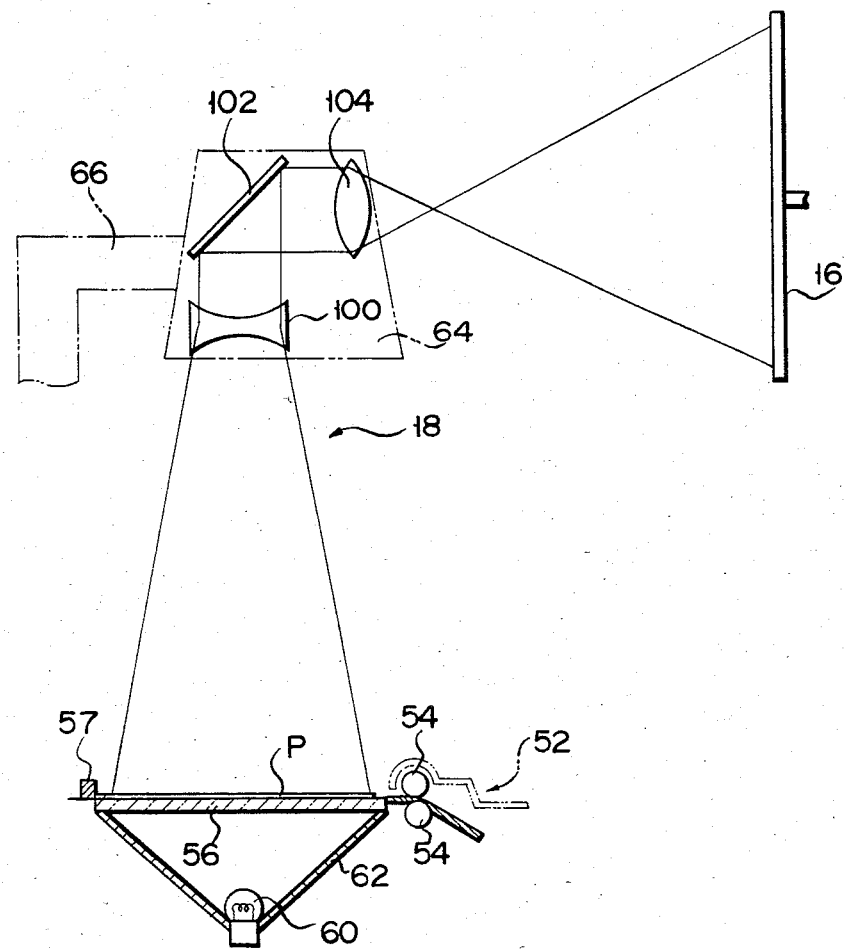
FIG. 10 is a side sectional view schematically showing a construction of an overhead projecting unit used in the image forming apparatus shown in FIG. 1.

As shown in FIG. 10, the projection head 64 comprises a concave lens 100 for converging light passing through the overhead projector table 56, a mirror 102 for changing a direction of the light passing through the concave lens 100 at a substantially right angle, and a convex lens 104 for enlarging the light reflected from the mirror 102 and projecting it to the screen 16. According to this arrangement, an image formed on the sheet P placed on the overhead projector table 56 is projected.

Figure 11:
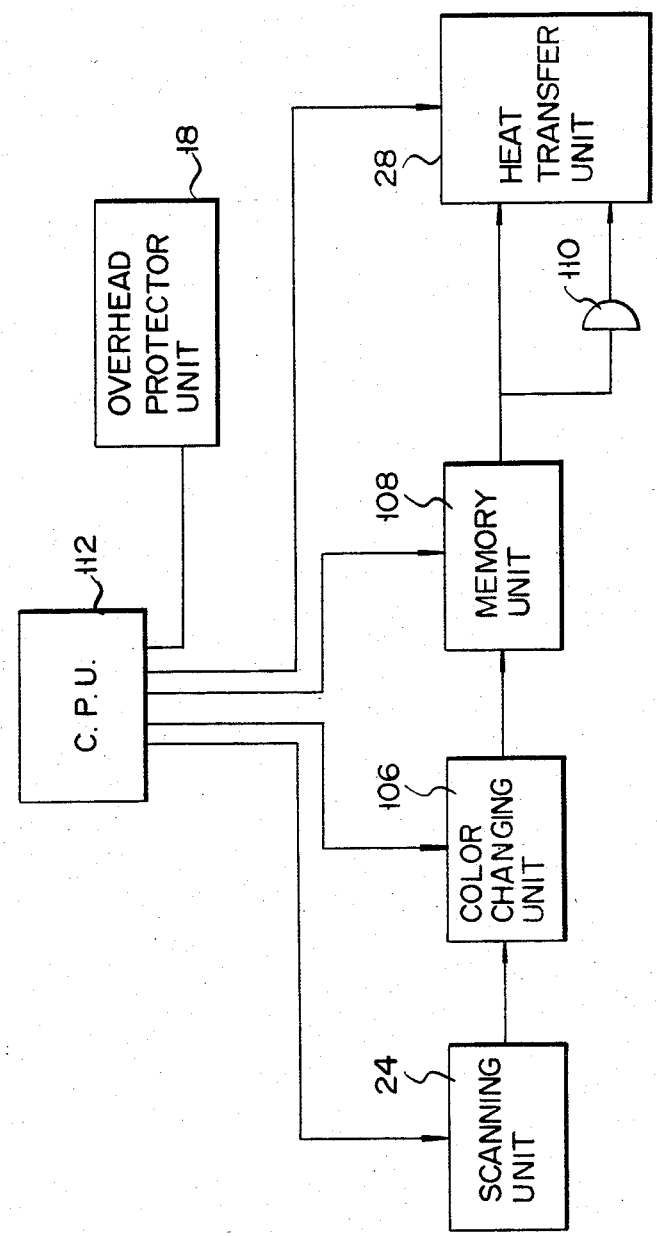
FIG. 11 is a block diagram schematically showing a circuit configuration of the main unit of a thermal transfer unit of the image forming apparatus shown in FIG. 1.

A control system for controlling the image forming apparatus 10 will now be described with reference to FIG. 11.

A color changing unit 106 and a memory unit 108 are respectively arranged between the scanning unit 24 and the thermal transfer unit 28. The color changing unit 106 is coupled to the scanning unit 24. The color changing unit 106 converts signals of color components (i.e., color signals of green, yellow and cyan) detected by the scanning unit 24 so as to correspond to colors of color agents (inks) i.e., magenta, yellow and cyan. The color changing unit 106 is coupled to the memory unit 108. The memory unit 108 stores information of corresponding positions and their colors on the document for each color. The memory unit 108 is coupled to the thermal transfer unit 28. The thermal transfer unit 28 transfers respective colors of inks on the sheet P in accordance with the information of corresponding colors and their positions read out from the memory unit 108, thereby forming an image on the sheet P. An AND circuit 110 is provided between the memory unit 108 and the thermal transfer unit 28. A black color is formed by an AND output of three color signals of magenta, yellow and cyan. When the ribbon 44 having a black ink portion (ribbon having four color inks) is used, the AND circuit 110 can be omitted.

The scanning unit 24, the color changing unit 106, the memory unit 108 and the thermal transfer unit 28 are commonly coupled to a central processing unit (CPU) 112. The CPU 112 controls generation timings of signals from each unit and operations thereof. The CPU 112 is further coupled to the overhead projector unit 18 and controls its operation.

According to the first embodiment of the present invention, an image on a document placed on a document table is copied on a sheet P and can be directly projected by the overhead projector onto a screen.

Figure 12:
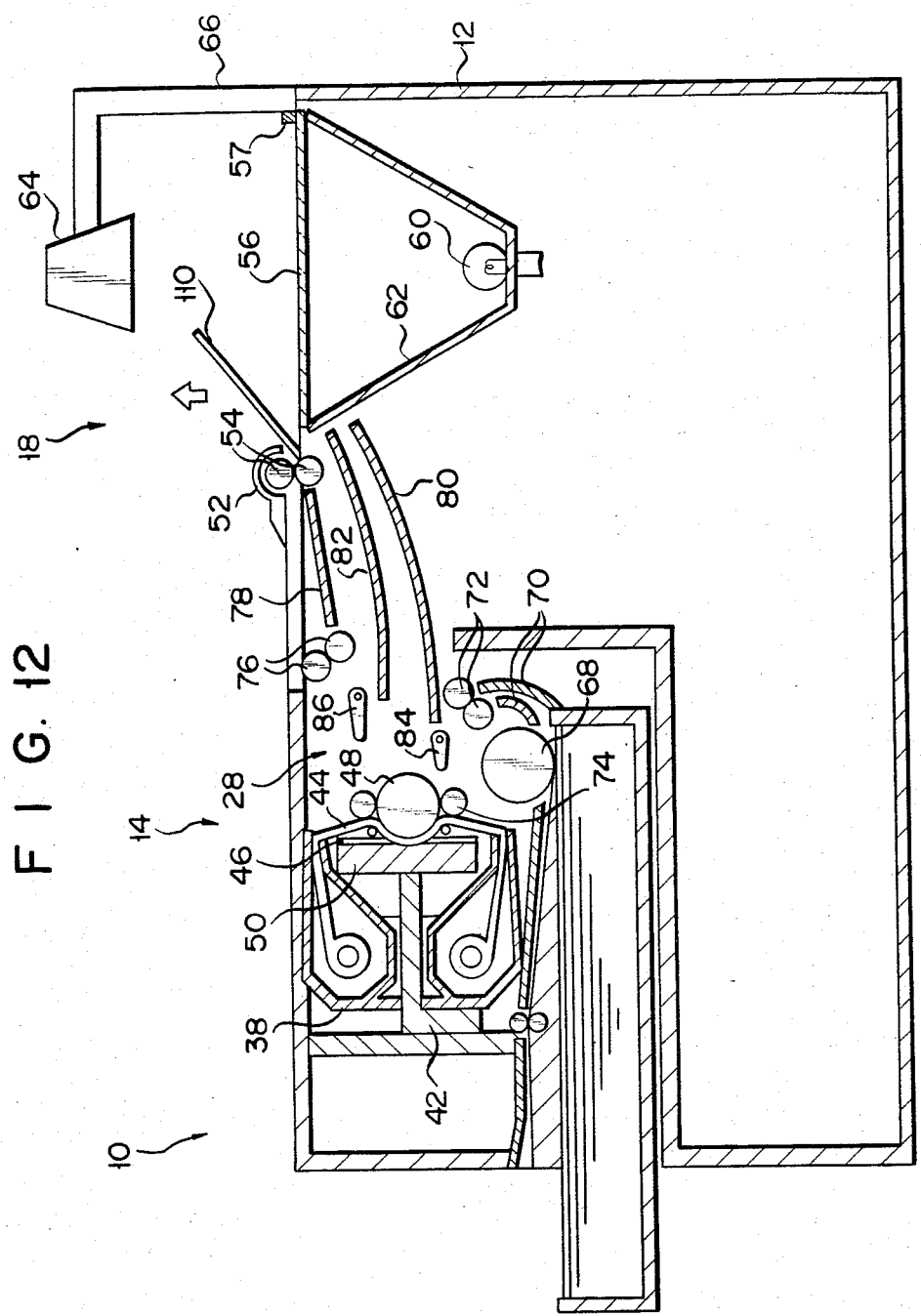
FIG. 12 is a schematic sectional view showing a modification of the image forming apparatus shown in FIG. 1.
Figure 13:
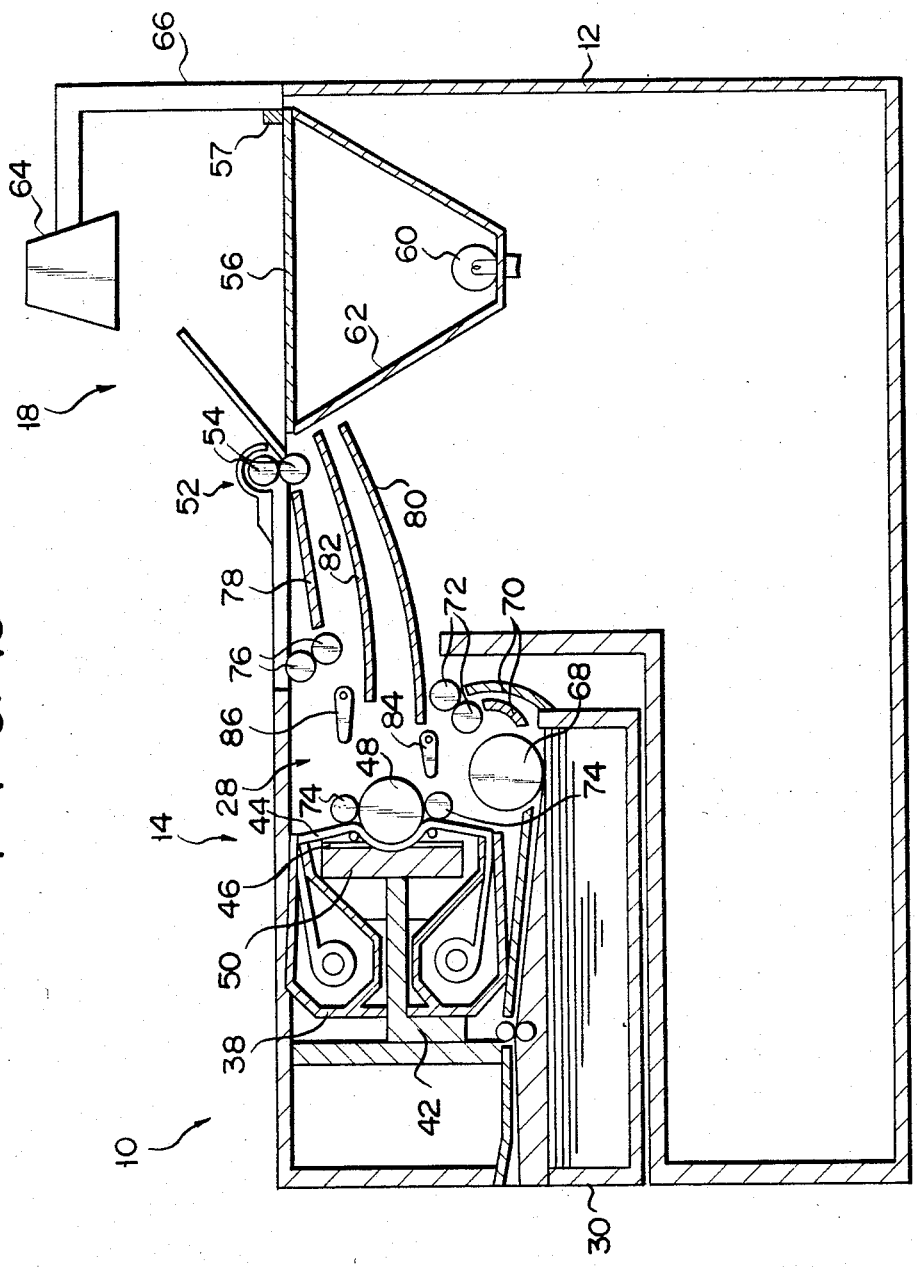
FIG. 13 is a schematic sectional view showing another modification of the image forming apparatus shown in FIG. 1.

FIGS. 12 and 13 respectively show modifications of the image forming apparatus 10 according to the first embodiment. As shown in FIG. 12, in the image forming apparatus 10 according to the first embodiment, a discharge tray 110 is detachably loaded in the conveying unit 52 so as to store the sheet P discharged from the conveying unit 52. When the overhead projector unit 18 is used, this detachable discharge tray 110 is unloaded, and the sheet P conveyed from the conveying unit 52 is directly placed on the overhead projector table 56. When the overhead projector unit 18 is not used, the discharge tray 110 is loaded in the conveying unit 52 and the sheet P conveyed from the conveying unit 52 is placed on the discharge tray 110.

In another modification shown in FIG. 13, the discharge tray 110 is also provided and the sheet feed cassette 30 which stores the sheets P is completely stored in the housing 12. According to this modification, the image forming apparatus 10 can be rendered compact.

Figure 15:
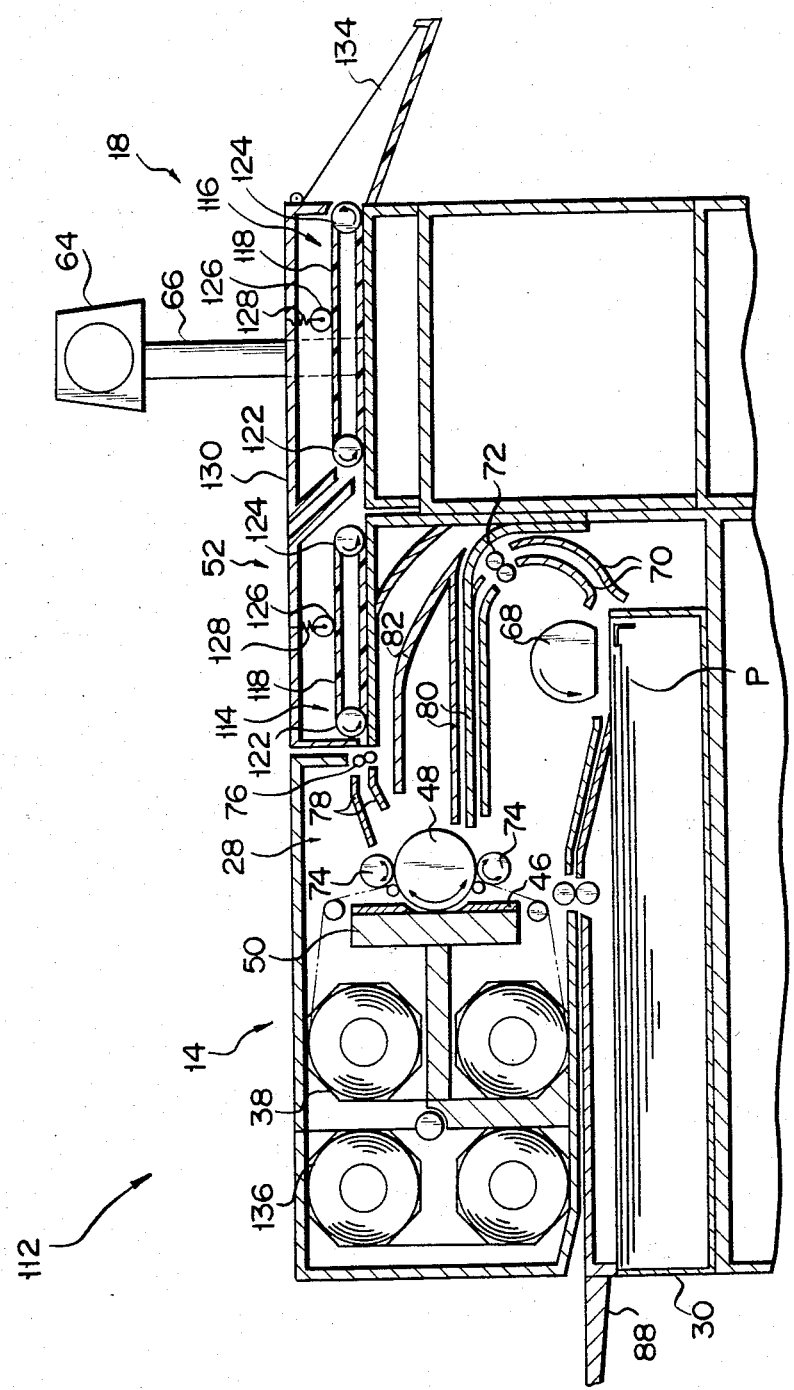
FIG. 15 is a schematic sectional view of the image forming apparatus shown in FIG. 14.
Figure 16:
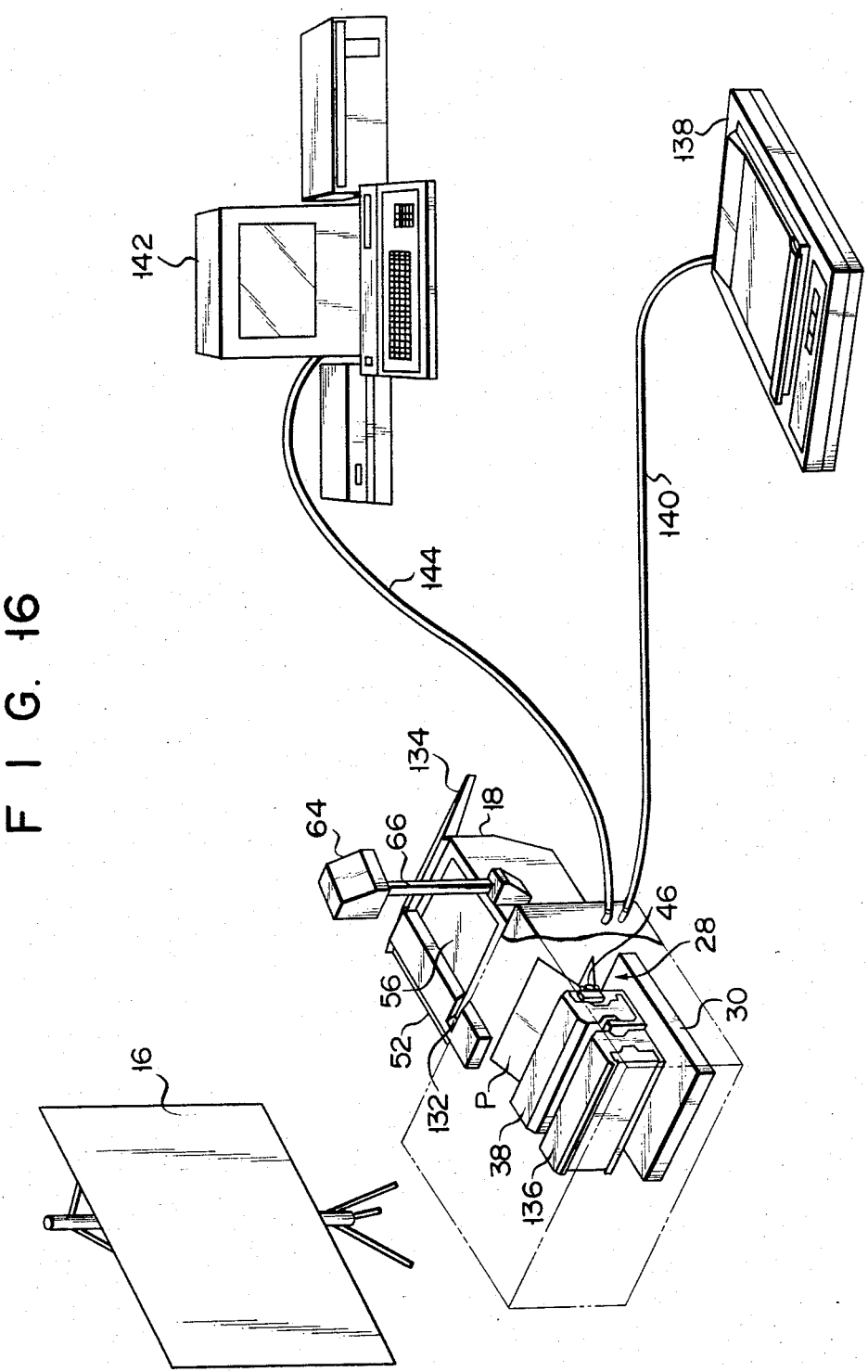
FIG. 16 is a view for explaining an application of the image forming apparatus shown in FIG. 14.

The second embodiment of the present invention will now be described in detail with reference to FIGS. 14 to 16. In the second embodiment, the same reference numerals as in the first embodiment denote the same parts in the second embodiment, and a detailed description thereof will be omitted.

Figure 14:
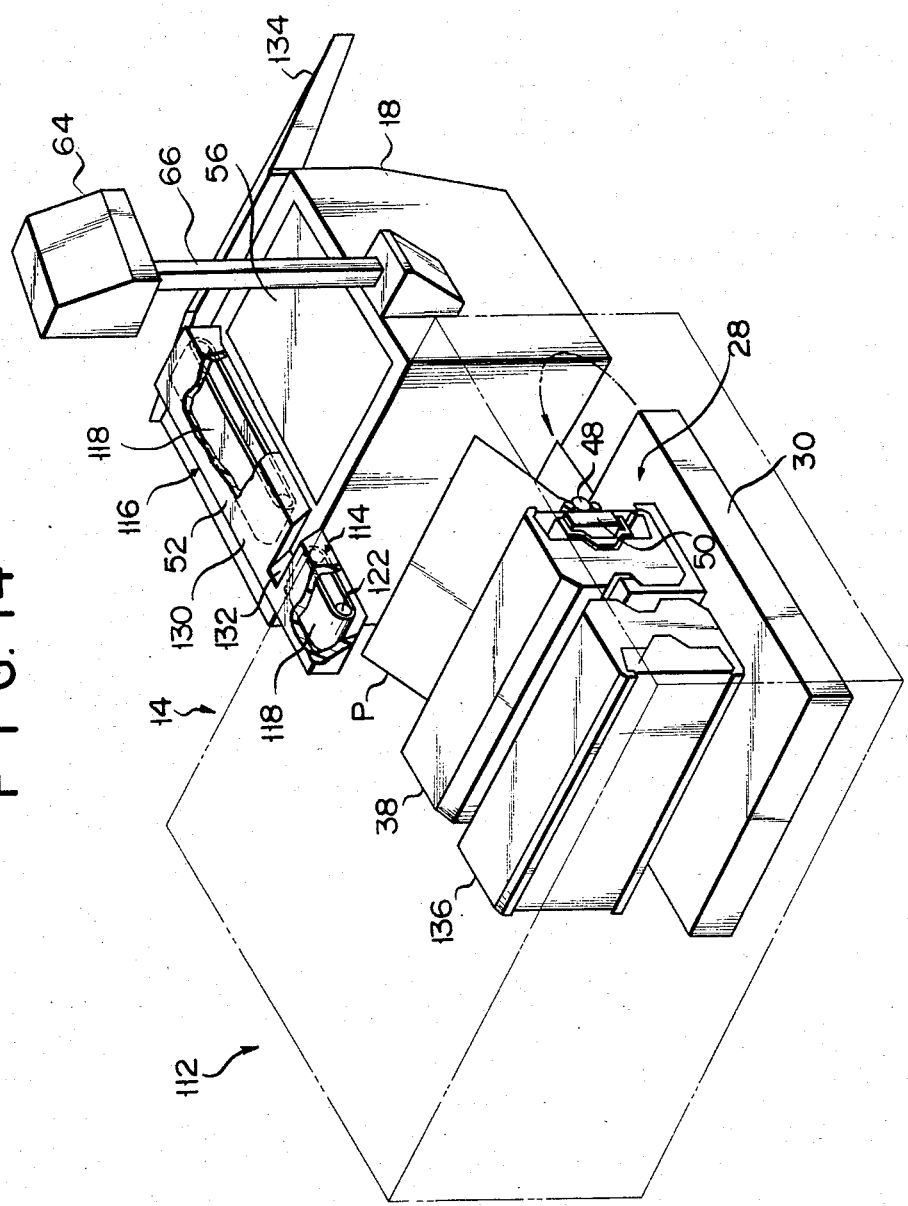
FIG. 14 is a schematic perspective view of an image forming apparatus according to a second embodiment of the present invention.

As shown in FIG. 14, in an image forming apparatus 112 according to the second embodiment, an image forming unit 14 (indicated by the alternate long and two short dashed line in FIG. 14) and an overhead projector unit 18 are separately provided. A conveying unit 52 is disposed across a housing 12 and the overhead projector unit 18. In other words, the conveying unit 52 is detachably provided on both the image forming unit 14 and the overhead projector unit 18.

The conveying unit 52 is disposed at a side end portion of an overhead projector table 56 so as to guide the edges of a sheet P discharged from discharging rollers 76 along the end portion in its conveying direction. First and second conveyor belt mechanisms 114 and 116 for conveying the sheet P are respectively provided at the sides of the housing 12 and the overhead projector table 56. In the first conveyor belt mechanism, a conveyor belt 118 formed of a rubber is looped between two rollers 122 and 124. A press roller 126 is arranged between the rollers 122 and 124 and always presses the conveyor belt 118 looped between the rollers 122 and 124 to provide tension thereto. The press roller 126 is supported by a casing 130 of the conveying unit 52 through a spring 128. The second conveyor belt mechanism 116 is disposed to be in series with the first conveyor belt mechanism 114 and comprises a conveyor belt 118, rollers 122 and 124, a press roller 126 and a spring 128 the same as those in the first conveyor belt mechanism 114. In the casing 130 of the conveying unit 52, a groove 132 is obliquely formed at a substantially central portion along the conveying direction of the sheet P. The sheet P to be projected can be manually fed one by one to the second conveyor belt mechanism 116 through this groove 132. In the overhead projector unit 18, a discharge tray 134 is provided to be inclined downward adjacent to the overhead projector table 56.

According to the second embodiment, since the image forming unit 14 and the overhead projector unit 18 are separately provided, each unit can be separated and can be independently used. When these units are used adjacent to each other, they can be integrally used through the conveying unit 52. In this case, the sheet P having an image formed by a thermal transfer unit 28 of the image forming unit 14 can be automatically conveyed to the overhead projector unit 18 by the conveying unit 52 and can be projected on the screen 16 (FIG. 16). Furthermore, since the conveying unit 52 is mounted to extend along the entire width of the overhead projector table 56, the projected sheet P can be automatically conveyed to the discharge tray 134 by the conveying unit 52. When the overhead projector unit 18 is not used, the sheet P having an image formed by the image forming unit 14 can be directly conveyed to the discharge tray 134 through the overhead projector table 56.

In the second embodiment, the thermal transfer unit 28 comprises an auxiliary ribbon cassette 136 at the back side of a ribbon cassette 38. Since a paper feed cassette 30 is completely stored in the housing 12, the housing 12 becomes compact.

In the image forming apparatus 112 according to the second embodiment, a scanning unit 24 for scanning a document to be copied is separately provided as a scanning section 138. The scanning section 138 is coupled to the image forming unit 14 through a cord 140. Furthermore, the thermal transfer unit 28 is coupled to a personal computer 142 through a cord 144. A signal of an image to be formed on the sheet P can be supplied from the personal computer 142.

The present invention is not limited to the embodiments described above and various modifications are deemed to lie within the spirit and the scope of the present invention.

For example, in the embodiments described above, a light-transmitting type overhead projector is used in which light passes through a sheet having an image thereon. However, instead of this type of projector, a light-reflecting type overhead projector in which light illuminates a sheet having an image thereon and reflected light from the sheet is projected through a projection head can be used to obtain the same effect.

In the embodiments described above, a thermal transfer unit is used in an image forming unit for forming an image on a sheet. However, an image forming unit having a copying function using a printing mechanism or a photosenitive body can be used to obtain the same effect.

What is claimed is:

1. An image forming apparatus for forming an image on a sheet according to an image information and projecting the image formed on the sheet, comprising:
    image forming means for forming the image on the sheet according to an image information;
    projecting means, arranged adjacent to said image forming means, for projecting the image formed on the sheet; and
    conveying means for conveying the sheet having the image formed by said image forming means thereon to said projecting means, wherein said conveying means comprises a detachable discharge tray disposed on the path along which sheets are conveyed to the projecting means, for receiving sheets having the image thereon when said overhead projector is not used.

2. An apparatus according to claim 1, wherein said image forming means comprises a ribbon on which an ink is coated, and a thermal transfer unit for forming the image on the sheet by heating and melting the ink in accordance with the image information.

3. An apparatus according to claim 2, wherein said image forming apparatus further comprises a scanning unit for scanning a document to be copied and for supplying an image information corresponding to the document to said thermal transfer unit.

4. An apparatus according to claim 3, wherein said image forming apparatus further comprises a casing for integrally holding said thermal transfer unit, said projecting means, and said conveying means.

5. An apparatus according to claim 4, wherein said projecting means includes an overhead projector having an overhead projection table with a position control member at one side thereof so as to control a position of the sheet to be placed.

6. An apparatus according to claim 4, wherein said conveying means comprises a pair of convey rollers disposed between said image forming unit and said projecting means so as to convey the sheet on which the image is formed by said image forming unit to said table.

7. An apparatus according to claim 3, wherein said thermal transfer unit, said projecting means, and said conveying means are separately arranged.

8. An apparatus according to claim 7, wherein said conveying means is elongated so as to be mounted across an upper side surface of said thermal transfer unit and that of said projecting means, whereby said conveying means conveys the sheet by holding a portion thereof.

9. An apparatus according to claim 8, wherein said conveying means comprises a conveying mechanism having a conveyor belt which extends along a longitudinal direction thereof, and rollers having said conveyor belt there between for driving said conveyor belt, and a cover for covering said conveying mechanism.

10. An apparatus according to claim 9, wherein said conveying means comprises two of said conveying mechanisms provided in series with each other, and a groove is formed in a substantially central portion of said cover corresponding to a portion between said conveying mechanisms, whereby an operator manually feeds a desired sheet to said projecting means through said groove.

11. An apparatus according to claim 10, wherein said projecting means includes an overhead projector having a projection table and a tray for receiving a sheet at one side of said table and at a side along a conveying direction of said conveying means.

12. An image forming apparatus for forming an image on a sheet according to an image information and projecting the image formed on the sheet, comprising:
    image forming means for forming the image on the sheet according to an image information, said image forming means including a sheet feed cassette for storing a plurality of sheets to form an image thereon, and a manual feed guide for manually feeding the sheets one by one;
    projecting means, arranged adjacent to said image forming means, for projecting the image formed on the sheet, wherein said projecting means comprises a light-transmitting type overhead projector, said light-transmitting type overhead projector having an overhead projection table which is formed of a light-transmitting material and on which the sheet having the image thereon is placed, an optical source for illuminating said table, and a projection head for projecting the image; and
    conveying means for conveying the sheet having the image formed by said image forming means thereon to said projecting means, wherein said conveying means comprises a detachable discharge tray disposed on the path along which sheets are conveyed to the projecting means, for receiving sheets having the image thereon when said overhead projector is not used.

13. An apparatus according to claim 12, wherein said image forming apparatus further comprises a scanning unit for scanning a document to be copied and for supplying an image information corresponding to the document to said image forming means.

14. An apparatus according to claim 13, wherein said image forming apparatus further comprises a casing for integrally holding said thermal transfer unit, said overhead projector, and said conveying means.

15. An apparatus according to claim 14, wherein said overhead projection table comprises a position control member at one side thereof so as to control a position of the sheet to be placed.

16. An apparatus according to claim 13, wherein said image forming means, said overhead projector, and said conveying means are separately arranged.

17. An apparatus according to claim 16, wherein said conveying means is elongated so as to be mounted across an upper side surface of said image forming means and that of said overhead projection table, said conveying means including a conveying mechanism having a conveyor belt which extends along a longitudinal direction thereof and rollers having said conveyor belt therebetween for driving said conveyor belt, and a cover for covering said conveying mechanism, whereby said conveying means conveys the sheet by holding a portion thereof.

18. An apparatus according to claim 17, wherein said conveying means comprises two of said conveying mechanisms provided in series with each other, and a groove is formed in a substantially central portion of said cover corresponding to a portion between said conveying mechanisms, whereby an operator manually feeds a desired sheet to said table through said groove.

19. An apparatus according to claim 18, wherein said overhead projector comprises a tray for receiving a sheet at one side of said table and at a side along a conveying direction of said conveying means.

20. An image forming apparatus for forming an image on a sheet according to an image information and projecting the image formed on the sheet, comprising:
image forming means for forming the image on the sheet according to an image information, said image forming means including a sheet feed cassette for storing a plurality of sheets to form an image thereon, and a manual feed guide for manually feeding the sheets one by one;
projecting means, arranged adjacent to said image forming means, for projecting the image formed on the sheet, said projecting means including a light-transmitting type overhead projector, said light-transmitting type overhead projector having an overhead projection table which is formed of a light-transmitting material and on which the sheet having the image thereon is placed, an optical source for illuminating said table, and a projection head for projecting the image on a screen;
conveying means for conveying the sheet having the image formed by said image forming means thereon to said projecting means; and
a personal computer which is coupled to said image forming means, said personal computer generating an image signal which is supplied to said thermal transfer unit.

* * * * *